Dec. 30, 1930.  J. ROBINSON  1,787,122
AUTOMATIC CONNECTER
Original Filed July 29, 1921  4 Sheets-Sheet. 3
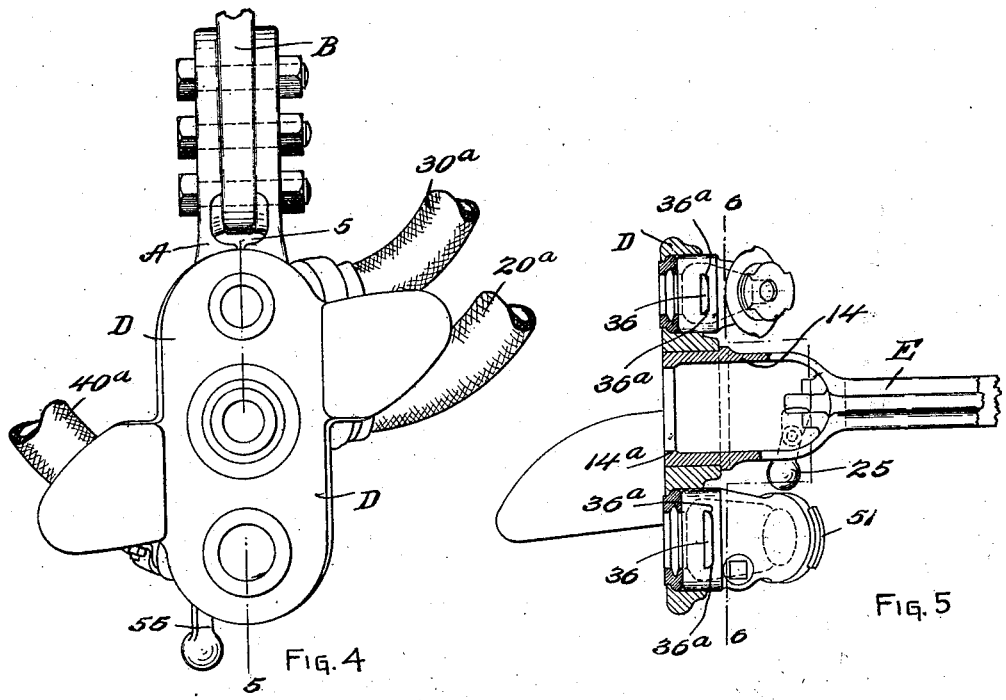
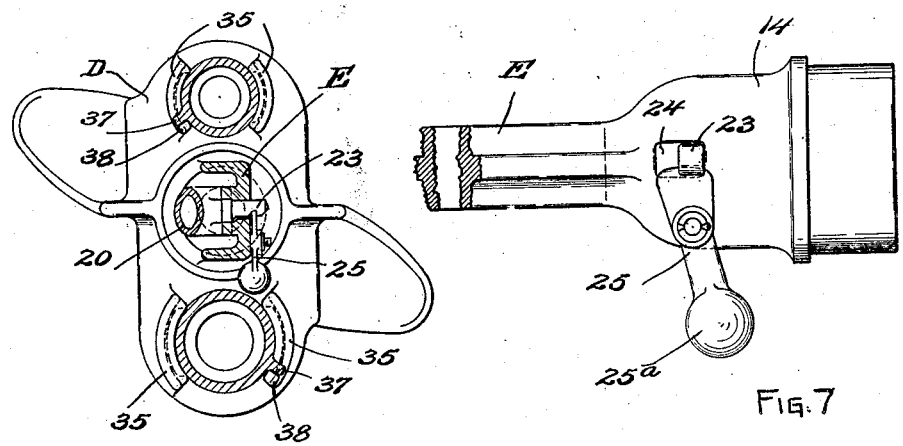
INVENTOR
Joseph Robinson
BY
Watson, Coet, Morse & Grindle
ATTORNEYS Dec. 30, 1930.  J. ROBINSON  1,787,122
AUTOMATIC CONNECTER
Original Filed July 29, 1921  4 Sheets-Sheet. 4
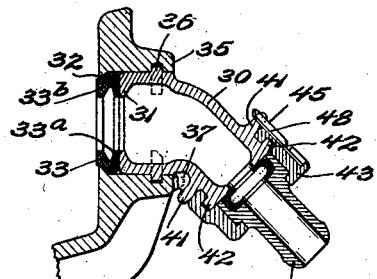
Fig. 8
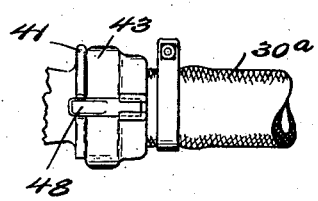
Fig. 9
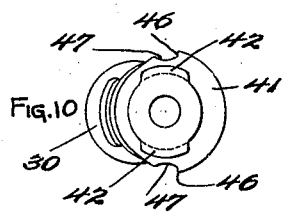
Fig. 10
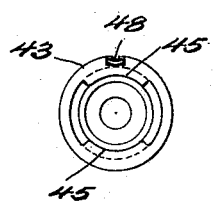
Fig. 11
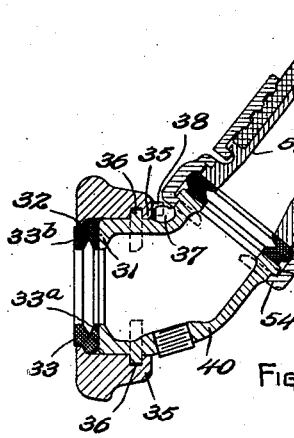
Fig. 12
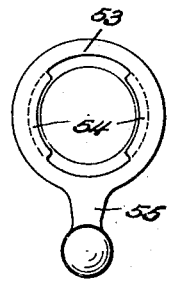
Fig. 13
Fig. 14
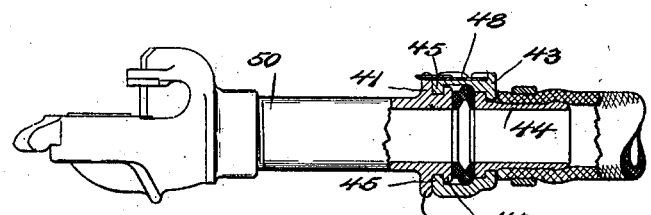
Fig. 15
INVENTOR
Joseph Robinson
BY
Watson, Coit, Morse & Grindle
ATTORNEYS Patented Dec. 30, 1930

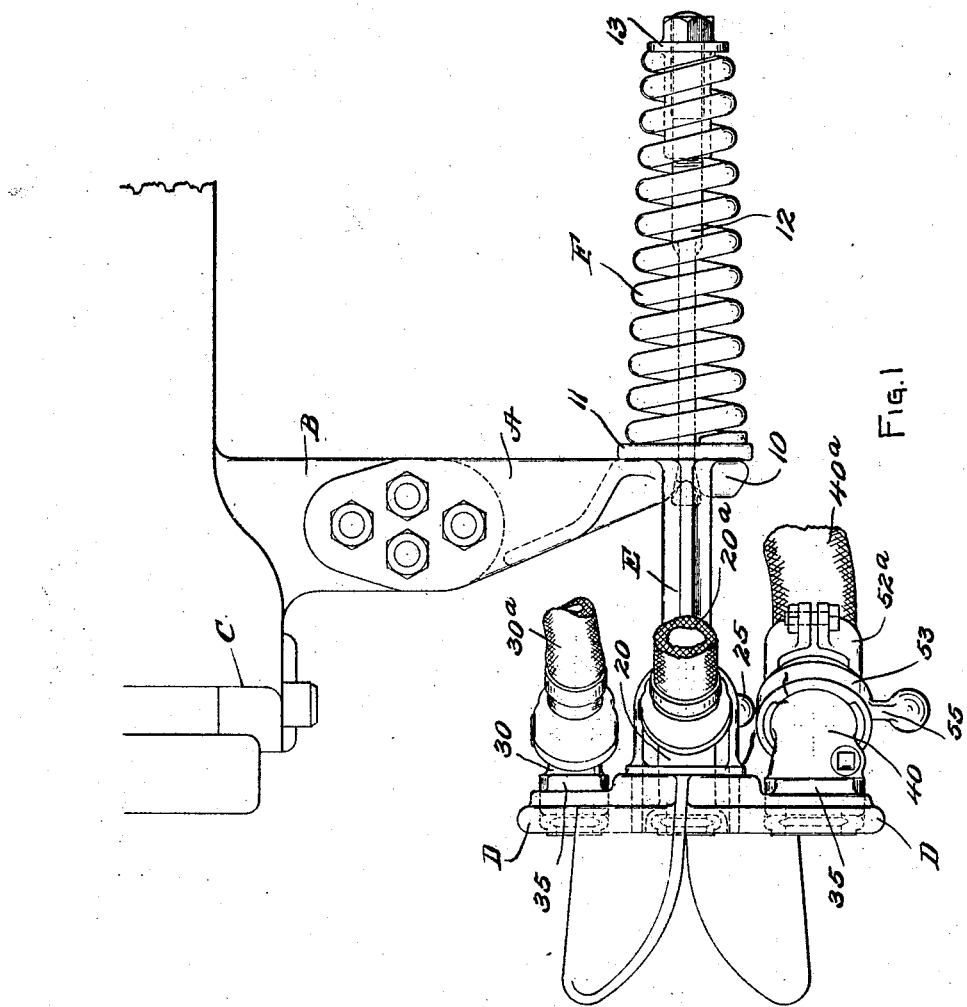

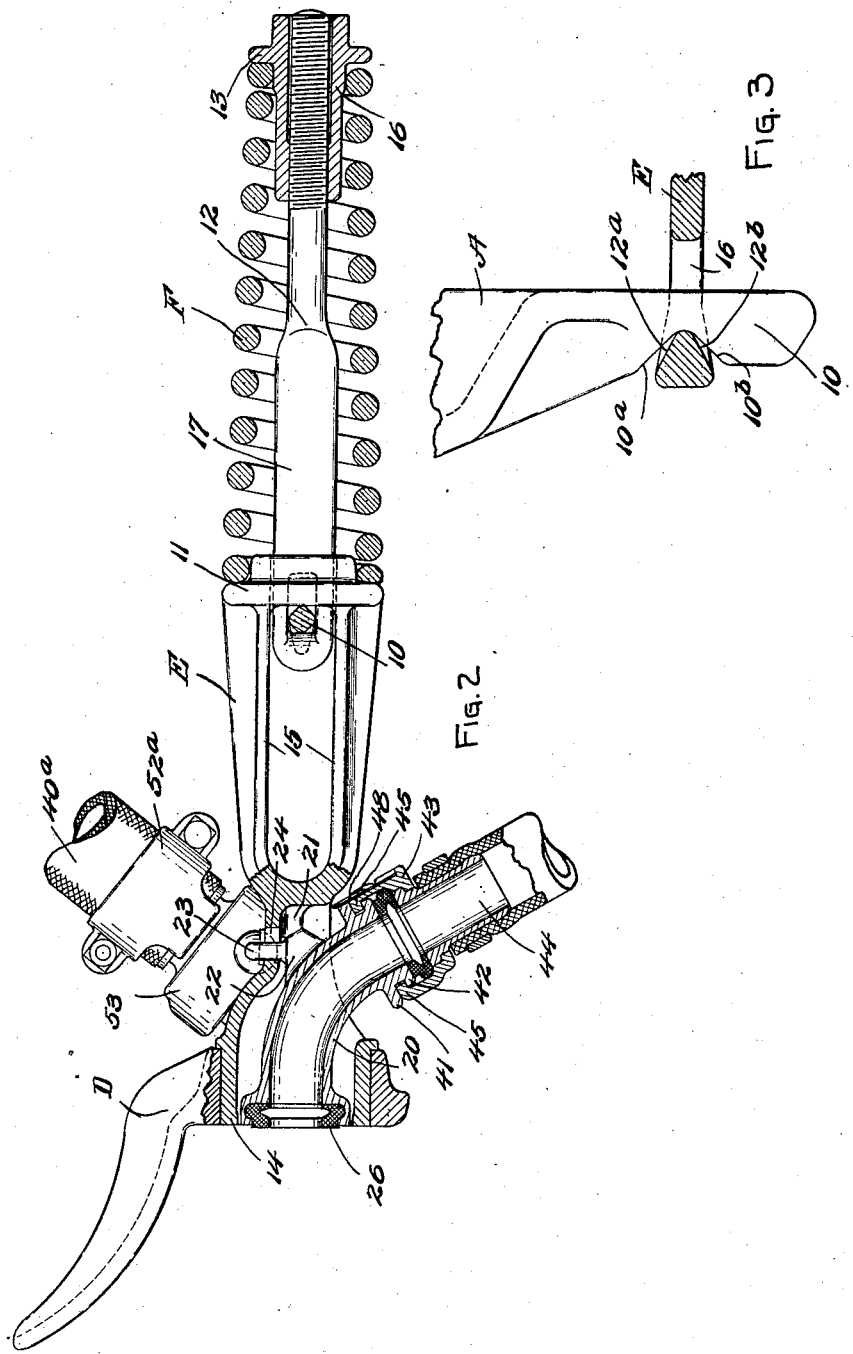

1,787,122

UNITED STATES PATENT OFFICE

JOSEPH ROBINSON, OF NEW YORK, N. Y.

AUTOMATIC CONNECTER

Application filed July 29, 1921, Serial No. 488,373. Renewed April 18, 1929.

This invention relates to automatic train pipe connecters and the object is to improve such connecters generally, and particularly to improve the means by which defective gaskets may be renewed while mated coupling heads remain coupled. The attainment of this object involves the improvement of the means by which the coupling head is yieldingly supported from the car, and the means by which the train pipe hose, normally connected to such head, may be readily disconnected therefrom, and coupled into interchange communication with the train pipe hose of a car not equipped with the automatic device.

With the constructions heretofore offered, the renewal of defective gaskets is quite difficult and consumes considerable time. Usually, some form of screw means or clamp must be undone to gain access to the defective gasket. These require the presences of special tools and since trainmen, especially those in freight service, carry no tools, it is quite an inconvenient matter to prepare for the operation of these types of gasket renewing devices.

In the bleak weather of winter the tedious task of adjusting a threaded plug or a clamp is especially objectionable to the trainmen, and where, as in most cases, the plug or clamp itself forms an air-tight joint which must be broken and remade with each renewal of the gasket, the operation becomes too painstaking to be dependable, or popular with the trainmen. The result is that to the serious detriment of the entire air brake system, worn out gaskets are not renewed and proper maintenance of the automatic coupling is neglected.

The removal of these difficulties is well accomplished, and other advantages are secured, by the construction set forth in the following specification and illustrated in the accompanying drawings in which:

Figure 1 shows a side elevation of an automatic connecter containing the various improvements mentioned;

Figure 2 is a horizontal longitudinal view of the construction illustrated in Figure 1;

Figure 3 is a detailed view showing the lower end of the bracket by which the connecter head is supported;

Figure 4 is a front view of the head;

Figure 5 is a sectional view on the line 5—5 of Figure 4;

Figure 6 is a sectional view substantially on the broken line 6—6 of Figure 5;

Figure 7 is a detailed view showing the means for locking the air hose nipple in the head;

Figure 8 is a sectional view through the signal port of the head and the nipple arranged therein, this figure also including a sectional view of the coupling employed between the nipple and signal hose;

Figure 9 is a detailed view further illustrating said coupling;

Figures 10 and 11 are detached views of the two parts which form the coupling shown in Figure 8;

Figure 12 is a sectional view through the steam port of the head and the nipple arranged therein, this view also showing in section the coupling employed to connect the steam hose to the nipple.

Figures 13 and 14 are detached views of the two parts of said coupling;

Figure 15 illustrates one of the train pipe hose coupled to an interchange device by which connection is made to a car not provided with an automatic connecter.

Referring to the drawings: A bracket A is suitably attached to the usual lug B of the car coupled C and is provided at its lower end with a vertically extending projection or anchor device 10, preferably rectangular in cross section as shown in Figure 2. A coupling head D is pressed onto, or otherwise suitably secured to as by threads, the forward end of a pipe or member E, which extends to the rear of the bracket A and which is provided with a flange 11, yieldingly held against the bracket by a coiled spring F surrounding a stem or tie rod 12 and held thereon by an abutment nut 13 adjustably threaded to the rear end of the stem as shown. The member E preferably extends into the head at approximately the center of the latter and is provided with an enlarged hollow forward end 14, and a pair of spaced straps 15 which lie in the horizontal plane and span the anchor device 10 and the tie rod 12. At their forward end the straps integrally join the rear portion of the enlarged hollow end 14 of the pipe and at the rear end they integrally join the flange 11. The front end of the tie rod 12 slidingly extends through an elongated opening in the flange 11 and is provided with an opening 16 through which the anchor device or projection 10 of the bracket projects, the tie rod 12 being elongated in cross section at 17 to afford a wide bearing surface for the rear end of the pipe or member E to slide upon and by which the member, and the coupling head D, are supported and held against undue rotation relative to the bracket A. The projection 10 of the bracket is provided on its front face with a depression having flaring walls 10$^a$, 10$^b$, which depression the tie rod or stem 12 is arranged to engage, the front end of the opening 16 in the stem having walls 12$^a$, 12$^b$, which flare away from the point at which the stem engages the projection 10. This construction provides a most efficient universal joint by which the head and the pipe are supported on the bracket A for free universal movement, the tension of the spring F acting to hold the forward end of the tie rod 12 firmly in the depression formed on the front face of the projection 10, and thus effectually preventing dislodgment of the several parts from the bracket.

As aforesaid, the forward end 14 of the pipe or member E is hollow and within such hollow portion a curved nipple or fitting 20 is mounted, this nipple forming the terminal portion of the air brake conduit and being inserted into the hollow end of the pipe from one side thereof, as shown in Figure 2. To maintain the fitting 20 in proper position in the member E the latter is provided with an abutment 21 which is accurately machined and which is adapted to engage with an accurately formed abutment 22 on the fitting. A projection 23 of the fitting 20 extends through an opening 24 in the member E and the latter carries a pivoted lever or other suitable form of latch 25 which is adapted to engage the projection 23 of the nipple and lock the same in position. The lever 25 is weighted at 25$^a$ and the contacting portions of this lever and the projection 23 are so shaped that the lever will be swung about its pivot and the fitting 20 will be automatically locked in position when it is inserted in the member E and the projection 23 pushed through the opening 24 of this member. The front end of the fitting 20 terminates substantially flush with the coupling face of the head and carries a gasket 26 which cooperates with a similar gasket in a mating head, the fitting being positioned in the hollow end 14 of the pipe by an annular ring or guide 14$^a$—see Figure 5. The rear end of the fitting 20 is connected to the air brake hose by means of a coupling or union which will later be described.

Another important feature of the invention lies in the novel means employed for securing the signal fitting or nipple 30 and the steam fitting or nipple 40 in the head, the means employed being the same for each of these fittings and a single description will suffice. As shown in Figures 8 and 12, each of the fittings 30 and 40 are mounted in openings in the head D and terminate in a flat face or end portion 31 which is positioned at the rear of the coupling face of the head D, said openings in the head being provided with an overhanging portion 32 which forms a shoulder or seat. Between these shoulders 32 and the front ends of the nipples there is arranged an interiorly grooved gasket 33 which is provided with a flange 33$^a$ adapted to rest on the flat end of the fittings or nipples, 30, 40, and also with a portion of 33$^b$ adapted to contact with the shoulder 32 in the openings of the head. It will thus be seen that the fittings 30, 40 back up the gaskets and hold the same in position and that the gaskets will be expanded by the fluid pressure into tight engagement with the front ends of the fittings and the shoulders 32 of the head so that a tight joint will be maintained and escape of the fluid prevented. It will also be seen that when these fittings are removed the gaskets can easily be withdrawn from the openings.

The fittings are made removable from the head in the following manner. As will clearly appear from Figure 6 of the drawings, the head D is provided at its rear portion with projections or lugs 35 adjacent the openings in which the fittings 30 and 40 are mounted and each of said fittings is provided on its outer surface with lugs 36 which are adapted to be rotated behind the lugs 35 of the head. For the purpose of simplifying the manufacture of the coupling head D, the diameter of the opening between the lugs is preferably no less than the diameter of the openings in which the fittings 30, 40, rest in the head. The construction constitutes a bayonet joint for connecting the nipples 30, 40, to the head in which each of the nipples may rotate in the head slightly, and thus prevent excessive strains on their respective train pipe hose, a projection 37 being provided on the nipples to contact with a similar projection 38 on the head to prevent an excess amount of such rotation. It will thus be seen that by merely inserting the nipples 30, 40, in the head and rotating the same until the lugs 36 engage behind the lugs 35 of the head, the fittings will be secured in position and that by a reverse movement the fittings may be disengaged from the head. The gaskets are thus rendered accessible without separation of the mating heads on adjacent cars. Preferably, the gaskets are slightly compressed when the fittings are inserted, and this is accomplished by tapering the lugs 36 as at 36ª, Figure 5, to provide a cam action which will cause the fittings to move forward and compress the gaskets as they are rotated into position.

In the construction thus far described, it will be apparent that if the train pipe hose are directly and rigidly attached to the nipples 30, 40, it will be necessary to twist the hose in attaching the nipples to the head or detaching the same therefrom. Ordinarily this is not objectionable. However, in cold weather the hose becomes stiff and frozen and twisting of the same is practically impossible, or if twisted they sometimes refuse to return to normal position with the result that detachment of the fittings takes place while the cars are in motion. To overcome this difficulty there has been devised, as part of this invention, a novel form of union or coupling for connecting the brake line hose 20ª and the signal line hose 30ª to the fittings 20 and 30 and another and similar form for connecting the steam line hose 40ª to the fitting 40.

Referring particularly to Figures 2, 8, 9, 10 and 11, in which the first mentioned form of union is illustrated, it will be seen that the fittings or nipples 20 and 30 are each provided on the rear end with a flange 41 and with two oppositely disposed lugs or projections 42 spaced from said flange. The other portion of the union or coupling comprises a rotatable member or nut 43 and a shank 44 which is adapted to be clamped to the hose. The shank 44 is rotatably arranged within the member 43 and the latter is provided with spaced radially projecting lugs 45 which are adapted to be rotated behind the lugs 42 of the nipples to lock the parts together. The flange 41 on the nipple is cut away or reduced on one side as shown in Figure 10 and at the ends of such reduced portion there is provided shoulders 46 adjacent to which there are depressions 47. The rotatable member 43 carries a locking spring 48 properly swaged thereto which is adapted to overlie the reduced portion of the flange 41 on the nipple when the members of the coupling are brought together. A suitable form of expansible gasket is employed to prevent escape of pressure fluid between the parts of the coupling. It will be understood that the relation of the various parts is such that when the nut 43 is placed against the end of the nipple and rotated to bring the lugs 45 behind the lugs 42, the spring 48 will slide over the reduced portion of the flange 41 and contact with one of the shoulders 46 to prevent further relative rotation between the parts. When rotation is thus stopped the spring 48 will lie in one of the depressions 47 and hold the parts in position. The parts can thus be locked in position by rotating the part 43 in either direction relative to the nipple. To disconnect the members of the coupling it is of course only necessary to rotate the member 43 until the spring 48 lies substantially midway between the shoulders 46 of the flange 41 when the parts may be separated. From the foregoing construction it will be evident that the hose without being twisted can be disconnected from the nipples and the nipples then removed from the head to permit access to the gaskets.

In making connection between a car equipped with automatic connecters and one not so equipped, some form of interchange becomes necessary and under such circumstances I prefer to employ an interchange device 50 as shown in Figure 15 one end of which is constructed in the same manner as the rear end of the nipples 20 and 30, so that when desired a hose may be detached from the fitting in the head and connected by means of the unions or couplings directly to such interchange device.

In the case of the steam line, it is preferred to employ a somewhat different union or coupling between the fitting or nipple 40 and the hose. Referring to Figures 1, 12, 13 and 14, it will be seen that the nipple 40 on its rear end is provided with two oppositely disposed lugs or ears 51. A shank member 52 is connected to the steam hose 40ª by any suitable means as a two piece clamp 52ª and upon said shank member 52 there is rotatably mounted the nut or rotatable member 53, which is provided with oppositely disposed inwardly projecting lugs or ears 54 adapted to engage behind the lugs 51 of the nipple 40, dislodgement of the nut 53 from its seat on the shank 52 being prevented by the ends 52ᵇ of the clamp 52ª. The rotatable member 53 is further provided with a weighted handle 55 for rotating the same and holding it normally in position to keep the lugs 54 positioned behind the lugs 51. To effect disconnection of the parts it is of course only necessary to rotate the member 53 approximately one quarter of a revolution when the interengaging lugs 51, 54 will be disengaged. A suitable expansible gasket, preferably of the kind employed on the coupling face of the head, is inserted between the parts of the coupling to seal the joints between the parts. When it is desired to connect the hose 40ª to a mating hose of a car not equipped with the automatic connecter, an interchange device is employed similar to that described in connection with the fittings 20 and 30 and constructed and operated in all essential respects the same as that illustrated in Figure 15.

When the fittings 43, 53, are disconnected from the nipples 30 and 40 for the purpose of making interchange with an unequipped car as hereinbefore mentioned, the nipples 30 and 40 will tend to turn in their respective openings in the coupling head D. This is due to the fact that the nipples diverge laterally of the head, preferably in opposite directions, so that the outer or rear end thereof are carried to one side of the axis about which they rotate in the openings in the head. Thus gravity tends to rotate the nipples when disconnected from the fittings 43 and 53 aforesaid, the resistance of the gaskets 33 not ordinarily being sufficient to prevent such rotation, especially when the coupling head D is subjected to considerable vibratory motion. The projections 37 and 38, shown particularly in Figures 6, 8 and 12, serve to limit the extent of this rotation and to prevent the lugs 36 of the nipples rotating out of connection with the dogs 35 of the head. This arrangement comprehends gravity, or automatically, actuated means by which the nipples 30 and 40 are maintained in the head D.

Various changes and modifications within the spirit and scope of my invention may, of course, be made, in view of which I do not desire to be limited to the precise details illustrated or described.

Having thus described the invention what I claim as new and desire to secure by Letters Patent is:

1. In an automatic train pipe connecter, a coupling head having an opening therethrough, there being a shoulder formed adjacent the front end of the opening, a train pipe hose, a nipple rotatably connected to said hose and arranged in said opening and having its front end spaced from said shoulder, cooperating means on the nipple and head for removably locking the nipple in said opening, a gasket mounted in said opening in front of said nipple, said gasket having a portion resting against the end of the nipple and another portion resting against said shoulder and extending slightly beyond the front face of the head, said gasket being shaped to expand under fluid pressure and hold said nipple in locked position and to seal the joint between the nipple and head.

2. In an automatic train pipe connecter, a coupling head having an opening, a train pipe hose, a nipple rotatably secured on the end of the hose, said nipple being insertable in and removable from said opening while the head is connected to a mating head, and means rigid with the nipple and head for locking said nipple in said opening by rotating the same relative to the head.

3. In an automatic train pipe connecter, comprising in combination, a coupling head having an opening therethrough, a conduit mounted in said opening and removable rearwardly therefrom, a train pipe hose to which said conduit is rotatably connected, means to lock said conduit in said opening by rotating the same relative to said head and to said hose, said conduit having a surface against which a resilient gasket is adapted to bear, a gasket arranged in said opening, said gasket being provided with a front flange projecting forwardly and adapted to contact with a similar flange on a gasket in a mating head, and said gasket also having a rear flange adapted to contact with said surface on the conduit, said gasket also having an internal annular groove for receiving pressure fluid to expand the gasket tightly against said surface on the conduit and force the conduit rearwardly to increase the locking effect of said locking means.

4. In combination with a head for automatic train pipe connecters having an opening therethrough, a conduit mounted in said opening and removable rearwardly therefrom, a train pipe hose to which said conduit is rotatably connected, means to lock said conduit in said opening by rotating the same relative to said head and to said hose, said conduit at its front end terminating short of the front end of said opening and having a surface thereon facing forwardly, an expansible gasket arranged in the front end of said opening, said gasket having a rear flange adapted to bear against said surface on the conduit and having a front flange for cooperating with a similar flange on a gasket in a mating head, said gasket having an internal annular groove between said flanges to receive compressed fluid flowing through said opening, whereby said gasket is expanded and pressure is exerted to force said front flange forwardly and said rear flange rearwardly against said surface on the conduit.

In testimony whereof I hereunto affix my signature.

JOSEPH ROBINSON.